UNITED STATES PATENT OFFICE.

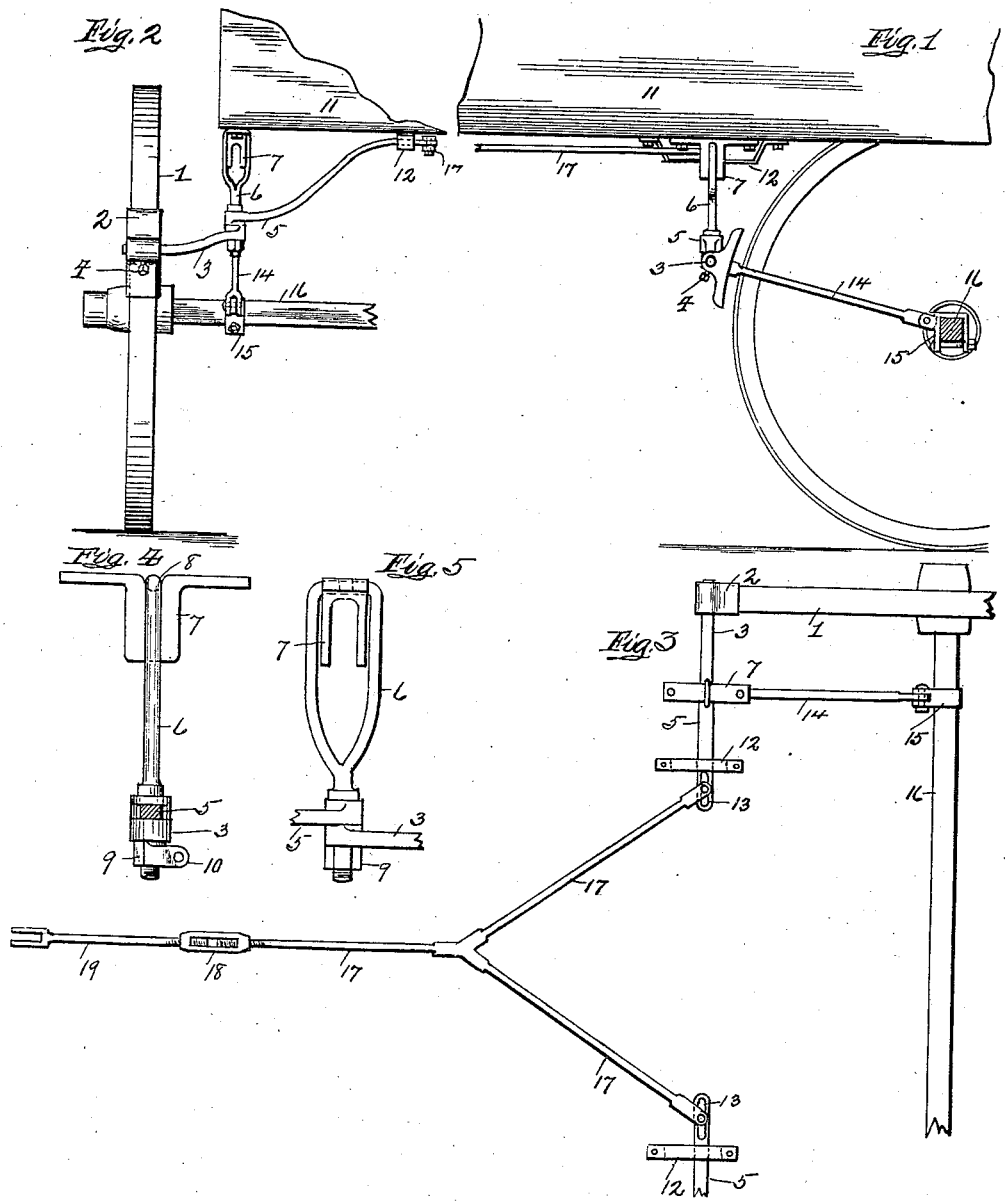

FRANCES A. GRACE, OF SHARON, PENNSYLVANIA.

VEHICLE OR WAGON BRAKE.

No. 880,791.  Specification of Letters Patent.  Patented March 3, 1908.

Application filed April 12, 1907. Serial No. 367,825.

*To all whom it may concern:*

Be it known that I, FRANCES A. GRACE, a citizen of the United States, residing at Sharon, in the county of Mercer and State of Pennsylvania, have invented a certain new and useful Improvement in a Vehicle or Wagon Brake; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in vehicle or wagon brakes, and it consists in the certain details of construction and combination of parts, as will be fully described hereinafter.

In the accompanying drawings, Figure 1 is a side elevation of my improved wagon brake, showing the same attached in position to an ordinary vehicle. Fig. 2 is an end elevation of the same. Fig. 3 is a plan view of the brake and connected gear, a part of the same being broken away. Fig. 4 is an enlarged detailed side elevation of one of the stirrups used for supporting the brake shoe and connected levers. Fig. 5 is a front elevation of the same.

To construct a wagon brake in accordance with my invention I form from suitable material, two stirrups, each of which consists of a casting 7, having downwardly-extending guides, horizontal flanges with bolt openings, for the purpose of attaching said castings beneath the body 11 of the vehicle, said casting having a centrally located groove or depression 8, on its top face, in which the stirrup proper (6) rests. This stirrup 6, comprises an open link, the sides of which bear against the downwardly projecting portions of the casting 7, to prevent side movement and the lower end of said link formed with a threaded shank, which shank is fitted with a nut 9, having a means (10) of connection with a rod 14, the purpose of which will be fully described hereinafter. Attached to the shank of the above described stirrup 6, are levers 3 and 5, the one extending toward the rear wheel 1, of the vehicle, and the other (5) inwardly and is bent upward and projected through a guide strap 12, attached in the proper position beneath the body 11 of the vehicle. The brake lever 3, is fitted with a brake shoe 2, formed from cast metal and attached thereto by a set screw 4. Connected to the nut 9 at the bottom of the stirrup 6 is a rearwardly-extending rod 14, the other end of which is loosely joined to a clip 15, rigidly fixed to the rear axle 16 of the vehicle, said clip being in direct line with the stirrup 6. The inner end of the lever 5, is slotted, and is connected to one branch of a Y shaped rod 17, which rod is connected by a sleeve nut 18, to the brake rod 19, the latter being connected to a brake lever in a manner well known in the art. The other branch of the Y shaped rod 17, is connected to a similar braking apparatus located at the other side of the vehicle body 11.

In operation, when the brake lever is operated to set the shoes 2 against the wheels 1, the strain is transferred from the rod 17 to the levers 5, and from this to the brake levers 3, the rods 14 holding the stirrups 6 rigid when the strain is in a direction toward the front of the vehicle, and when the brake is released, the movement of the parts is in an opposite direction.

By this construction and arrangement of a vehicle brake, the same will be found particularly useful when used on wagons having a spring-supported body, as all strain and undue tension, due to the operation of the brake, is transferred to the rear axle 16.

It is obvious that slight modifications and changes may be made in the details of construction, without departing from the spirit of the invention. Therefore I do not wish to confine myself to that shown and described.

Having thus described my invention, what I claim, and desire to secure by Letters Patent, is:—

1. In combination with a wagon body and its supporting wheels, swinging stirrups depending from the wagon body, guides within the stirrups for holding the stirrups against lateral movement, oppositely extending levers carried by the stirrups, rods pivotally connected at one end with the axle of the supporting wheel and at the opposite end to the stirrup, brake shoes carried by certain of the oppositely extending levers, and a brake rod in operative connection with the remaining levers.

2. In combination with a wagon body and its supporting wheels, swinging stirrups depending from the wagon body, guides within the stirrups for holding the stirrups against lateral movement, oppositely extending levers carried by the stirrups, rods pivotally connected at one end with the axle of the supporting wheel and at the opposite end to the stirrup, brake shoes carried by certain of the oppositely extending levers, a brake rod in operative connection with the remaining levers, and guide straps for the levers with which the brake rod connects.

3. In combination with a wagon body and its supporting wheels swinging stirrups depending from the wagon body, spaced guides within the stirrups for holding the stirrups against lateral movement, oppositely extending levers carried by the stirrups, rods pivotally connected at one end with the axle of the supporting wheels and at the opposite end to the stirrups, brake shoes carried by certain of the oppositely extending levers and a brake rod in operative connection with the remaining levers.

In testimony whereof, I affix my signature, in presence of two witnesses.

FRANCES A. GRACE.

Witnesses:
W. A. McKNIGHT,
MARY ADAMS.